(12) United States Patent
Mohler et al.

(10) Patent No.: US 10,781,117 B2
(45) Date of Patent: Sep. 22, 2020

(54) FLOCCULATION OF HIGH-SOLIDS MINERAL SLURRIES

(71) Applicant: Dow Global Technologies LLC, Midland, MI (US)

(72) Inventors: Carol E. Mohler, Midland, MI (US); Domonique Downing, Midland, MI (US); Paul A. Gillis, Lake Jackson, TX (US); Stephanie L. Hughes, Beaverton, MI (US); Jason S. Moore, Walnut Creek, CA (US); Michael K. Poindexter, Sugar Land, TX (US); Thomas L. Sanders, Jr., Saginaw, MI (US); Harpreet Singh, Pearland, TX (US); Cole A. Witham, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/743,774

(22) PCT Filed: Aug. 9, 2016

(86) PCT No.: PCT/US2016/046108
§ 371 (c)(1),
(2) Date: Jan. 11, 2018

(87) PCT Pub. No.: WO2017/034790
PCT Pub. Date: Mar. 2, 2017

(65) Prior Publication Data
US 2018/0201528 A1    Jul. 19, 2018

Related U.S. Application Data

(60) Provisional application No. 62/209,375, filed on Aug. 25, 2015.

(51) Int. Cl.
*C02F 1/56*     (2006.01)
*C10G 1/04*     (2006.01)
(Continued)

(52) U.S. Cl.
CPC .............. *C02F 1/56* (2013.01); *B01D 21/01* (2013.01); *C02F 11/14* (2013.01); *C02F 11/16* (2013.01);
(Continued)

(58) Field of Classification Search
None
See application file for complete search history.

(56) References Cited

U.S. PATENT DOCUMENTS

| 4,342,653 A | 8/1982 | Halverson |
| 4,678,585 A | 7/1987 | Brownrigg |
(Continued)

FOREIGN PATENT DOCUMENTS

WO    2011070218    6/2011

OTHER PUBLICATIONS

Li, et al., Synergetic Role of Polymer Flocculant in Low-Temperature Bitumen Extraction and Tailings Treatment, Energy & Fuels, 2005, pp. 936-943, vol. 19.

*Primary Examiner* — Clare M Perrin (57) ABSTRACT

The present invention relates to a method of dewatering an aqueous mineral suspension comprising introducing into the suspension a flocculating system comprising a mixture of polyethylene glycol and polyethylene oxide polymers, in particular a mixture of one or more low molecular mass polyethylene glycol with one or more high molecular mass polyethylene oxide. Said mixture of polyethylene glycol and polyethylene oxide polymers is useful for the treatment of suspensions of particulate material, especially waste mineral slurries. The invention is particularly suitable for the treat-
(Continued)

ment of tailings and other waste material resulting from mineral processing, in particular, the processing of oil sands tailings.

14 Claims, 3 Drawing Sheets

(51) Int. Cl.
    *B01D 21/01*     (2006.01)
    *C02F 11/16*     (2006.01)
    *C02F 11/14*     (2019.01)
    *C02F 11/122*     (2019.01)
    *C02F 11/123*     (2019.01)
    *C02F 11/127*     (2019.01)
    *C02F 101/20*     (2006.01)
    *C02F 103/10*     (2006.01)
    *C02F 101/32*     (2006.01)
    *C02F 101/10*     (2006.01)
    *C02F 101/00*     (2006.01)
    *C02F 103/16*     (2006.01)

(52) U.S. Cl.
    CPC .............. C10G 1/04 (2013.01); *C02F 11/122* (2013.01); *C02F 11/123* (2013.01); *C02F 11/127* (2013.01); *C02F 2101/006* (2013.01); *C02F 2101/105* (2013.01); *C02F 2101/20* (2013.01); *C02F 2101/203* (2013.01); *C02F 2101/32* (2013.01); *C02F 2103/10* (2013.01); *C02F 2103/16* (2013.01)

(56) References Cited

U.S. PATENT DOCUMENTS

| | | |
|---|---|---|
| 4,704,209 A | 11/1987 | Richardson et al. |
| 4,931,190 A | 6/1990 | Laros |
| 5,104,551 A | 4/1992 | Davis et al. |
| 6,383,282 B1 | 5/2002 | Chaiko |
| 7,901,583 B2 | 3/2011 | McColl et al. |
| 2012/0160776 A1 | 6/2012 | Franks et al. |
| 2013/0043165 A1* | 2/2013 | Revington ............ B01F 5/0463 208/188 |
| 2014/0158633 A1* | 6/2014 | Holt .................... C02F 1/56 210/728 |

* cited by examiner

FLOCCULATION OF HIGH-SOLIDS MINERAL SLURRIES

FIELD OF THE INVENTION

The present invention relates to polymeric flocculants, specifically polyethylene oxide polymers and use thereof for the treatment of suspensions of particulate material, especially waste mineral slurries. The invention is particularly suitable for the treatment of tailings and other waste material resulting from mineral processing, in particular, processing of oil sands tailings.

BACKGROUND OF THE INVENTION

Processes that treat mineral ores in order to extract mineral values including in some cases the recovery of hydrocarbons will normally result in waste material. Often the waste material consists of an aqueous slurry or sludge comprising particulate mineral material, for instance clay, shale, sand, grit, metal oxides, etc. admixed with water and possibly residual hydrocarbons.

In some cases the waste material such as mine tailings can be conveniently disposed of in an underground mine to form backfill. For other applications it may not be possible to dispose of the waste in a mine. In these instances, it is common practice to dispose of this material by pumping the aqueous slurry to open mines, pits, lagoons, heaps or stacks and allowing it to dewater gradually through the actions of sedimentation, drainage, evaporation, and consolidation.

There is a great deal of environmental pressure to minimize the allocation of new land for disposal purposes and to more effectively use the existing waste areas. Generally, the goal of oil sands tailings remediation is to recover water to be reused in the process and obtain solids that are dry enough so as to be trafficable so that the dried tailings/solids can be used to reclaim land. The exact requirements needed for final land reclamation and restoration will often be governed by regional or national mandates.

One method is to load multiple layers of waste onto an area to thus form higher stacks of waste. However, this presents a difficulty of ensuring that the waste material can only flow over the surface of previously consolidated waste within acceptable boundaries, is allowed to rigidify to form a stack, and that the waste is sufficiently consolidated to support multiple layers of consolidated material, without the risk of collapse or slip. Thus the requirements for providing a waste material with the right sort of characteristics for stacking is altogether different from those required for other forms of disposal, such as back-filling within a relatively enclosed area.

In a typical mineral processing operation, waste solids are separated from materials that contain mineral values in an aqueous process. The mined material may also encompass the recovery of hydrocarbons. The aqueous suspension of waste solids often contains clays and other minerals, and is usually referred to as tailings. This is true in a variety of mineral solids including tailings from oil sands. These solids can be concentrated by a flocculation process in a thickener to give a higher density underflow and to recover some of the process water. It is usual to pump the underflow to a surface holding area, often referred to as a tailings pit or dam. Other ways to treat the flocculated solids include, for example, thin-lift which involves depositing on a slope with dewatering and evaporation, deep-pit, filter presses, belt presses, or centrifuges.

Once deposited at this surface holding area, water will continue to be released from the aqueous suspension resulting in further concentration of the solids over a period of time. Once a sufficient volume of water has been collected this is usually pumped back to the mineral processing plant. Once the solids content is high enough in the dewatered solids, land reclamation becomes possible.

Sometimes the solids content is not high enough after a first treatment and tailings may need to be retreated to further increase its solid content.

Flocculants are also used to treat legacy tailings, sometimes referred to as mature fine tailings (MFT), such as those collected and concentrated in ponds.

The prior art contains numerous references to flocculation processes and various proposed flocculating agents, for example see U.S. Pat. No. 7,901,583.

Polymeric flocculants include polymers of sodium acrylate, for example see U.S. Pat. No. 4,342,653 and sulfonate polymers, for example see U.S. Pat. No. 4,704,209.

Polymers of acrylamide are commonly employed as flocculating agents. However, acrylamides suffer from various disadvantages, for instance, rapid hydrolyzation in alkaline solutions which makes them impractical for use in various applications that involve alkaline solutions, sensitivity to treatment dosage levels which makes it easy to under or overdose, floc shear instability, and/or floc structures which do not allow for complete dewatering.

U.S. Pat. No. 4,678,585 describes flocculating red mud suspensions in the Bayer alumina process using homopolymers of acrylic acid or sodium acrylate or polymers of acrylic acid or acrylate with acrylamide.

Li, et al., Energy & Fuels, 2005, vol. 19, pp. 936-943 disclose the effect of a hydrolyzed polyacrylamide (HPAM) on bitumen extraction and tailings treatment of oil sands ores. Careful control of HPAM dosage is necessary to achieve efficiency in both bitumen extraction and in flocculation of solid fines.

Polymers of polyethylene oxide are commonly employed as flocculating agents, for example see U.S. Pat. Nos. 4,931,190; 5,104,551; 6,383,282; and WO 2011070218. A primary disadvantage of such use of polymers of polyethylene oxide is that they produce small floc structures. US Publication No. 20120160776 discloses stimulant-sensitive flocculation using a polyethylene oxide/polypropylene block polymer.

In spite of the numerous polymeric flocculating agents, there is still a need for a flocculating agent to further improve consolidation of suspensions of materials as well as further improve upon the dewatering of suspensions of waste solids that have been transferred as a fluid or slurry to a settling area for disposal. In particular, it would be desirable to provide a more effective treatment of waste suspensions, such as oil sands tailings, transferred to disposal areas ensuring fast, efficient concentration, and more environmentally friendly storage of solids and improved clarity of released water.

BRIEF SUMMARY OF THE INVENTION

The present invention is a method for dewatering an aqueous suspension of particulate material comprising the steps of: a) adding to the aqueous suspension a mixture of polyethylene oxide polymers comprising (i) one or more low molecular mass polyethylene glycol polymer (PEG) having a molecular mass equal to or less than 35,000, preferably a molecular mass of 100 g/mol to 20,000 g/mol and (ii) one or more high molecular mass polyethylene oxide polymer (PEO) having a molecular mass greater than 1,000,000, preferably a molecular mass of 8,000,000 g/mol to 10,000,000 g/mol; b) allowing the suspension to flocculate; and c) dewatering the suspension, preferably the mixture of polyethylene oxide polymers is added as an aqueous mixture.

In one embodiment of the method disclosed herein above, the aqueous suspension of particulate material comprises tailings and other waste material resulting from the mineral processing of phosphate, diamond, gold, mineral sands, zinc, lead, copper, silver, uranium, nickel, iron ore, coal, oil sands, or red mud.

In one embodiment of the method disclosed herein above, the aqueous suspension of particulate material comprises tailings and other waste material resulting from the mineral processing of oil sands.

DETAILED DESCRIPTION OF THE INVENTION

According to the present invention, we provide a method of dewatering an aqueous suspension of particulate material comprising introducing into the suspension a flocculating system comprising a mixture of polyethylene oxide-based polymers comprising (i) one or more of a low molecular mass polyethylene glycol polymer (PEG) and (ii) one or more of a high molecular mass polyethylene oxide polymer (PEO). The mixture of polyethylene oxide polymers of the present invention may be applied to an aqueous suspension of the particulate mineral material as it is transferred as a fluid to the deposition area, an intermediate treatment area and/or once it has been transferred to the deposition area. By deposition area we mean any area where the aforementioned particulate material can be deposited. This can for instance be any area where waste is deposited from a mineral processing operation. Alternatively, it may be any area that has been excavated, for instance to extract useful material e.g., mineral values including bitumen and in which the excavated area is filled with particulate material treated according to the invention.

Suspended solids may be concentrated in a thickener and this material will for instance leave the thickener as an underflow which will be pumped along a conduit to a deposition area. The conduit can be any convenient means for transferring the material to the deposition area and may for instance be a pipe or a trench. The material remains fluid and pumpable during the transfer stage until the material is allowed to stand. Other means of mechanical treatment include the use of thin-lift deposition, filter presses, belt presses and/or centrifuges.

In one embodiment, the process of the invention is part of the mineral processing operation in which an aqueous suspension of waste solids is optionally flocculated in a vessel to form a supernatant layer comprising an aqueous liquor and an underflow layer comprising thickened solids which form the material. The supernatant layer will be separated from the under flow in the vessel and typically recycled or subjected to further processing. The aqueous suspension of waste solids or optionally, the thickened underflow is transferred, usually by pumping, to a deposition area, which may for instance be a tailings pit, dam, or pond.

The material may consist of only mainly fine particles, or a mixture of fine and coarse particles. Once the material has reached the deposition area it is allowed to settle and dewater and in addition preferably consolidation takes place. The mixture of polyethylene glycol and polyethylene oxide polymers may be added to the material in an effective amount at any convenient point, typically during transfer. In some cases the aqueous suspension may be transferred first to a holding vessel before being transferred to the deposition area. After deposition of the suspension of particulate mineral material it will dewater to form a dewatered solid. Preferably the dewatered suspension of particulate mineral material will form a compact and dry solid mass through the combined actions of sedimentation, drainage, evaporative drying, and consolidation.

The deposited particulate mineral material will reach a substantially dry state. In addition the particulate mineral material will typically be suitably consolidated and firm e.g., due to simultaneous settling and dewatering to enable the land to bear significant weight.

Suitable doses of the mixture of polyethylene oxide polymers range from 10 grams to 10,000 grams per ton of material solids. Generally the appropriate dose can vary according to the particular material and material solids content. Preferred doses are in the range 30 to 7,500 grams per ton, more preferably 100 to 3,000 grams per ton, while even more preferred doses are in the range from 500 to 3,000 grams per ton. The mixture of polyethylene glycol and polyethylene oxide polymers may be added to the suspension of particulate mineral material, e.g., the tailings slurry, in solid particulate form, an aqueous solution that has been prepared by dissolving the mixture of polyethylene glycol and polyethylene oxide polymers into water or an aqueous-based medium, or a suspended slurry in a solvent.

The mineral material particles are usually inorganic. Typically the material may be derived from or contain filter cake, tailings, thickener underflows, or unthickened plant waste streams, for instance other mineral tailings, slurries, or slimes, including phosphate, diamond, gold slimes, mineral sands, tails from zinc, lead, copper, silver, uranium, nickel, iron ore processing, coal, oil sands or red mud. The material may be solids settled from the final thickener or wash stage of a mineral processing operation. Thus the material desirably results from a mineral processing operation. Preferably the material comprises tailings. Preferably the mineral material would be hydrophilic and/or bi-wettable in nature and more preferably selected from red mud and tailings containing hydrophilic clay, such as oil sands tailings, etc.

The fine tailings or other material which is pumped may have a solids content in the range 5 percent to 80 percent by weight. The slurries are often in the range 15 percent to 70 percent by weight, for instance 25 percent to 40 percent by weight. The sizes of particles in a typical sample of the fine tailings are substantially all less than 45 microns, for instance about 95 percent by weight of material is particles less than 20 microns and about 75 percent is less than 10 microns. The coarse tailings are substantially greater than 45 microns, for instance about 85 percent is greater than 100 microns but generally less than 10,000 microns. The fine tailings and coarse tailings may be present or combined together in any convenient ratio provided that material remains pumpable.

The dispersed particulate solids may have a unimodal, bimodal, or multimodal distribution of particle sizes. The distribution will generally have a fine fraction and a coarse fraction, in which the fine fraction peak is substantially less than 45 microns and the coarse (or non-fine) fraction peak is substantially greater than 45 microns.

We have found better results are obtained in terms of dewatering and consolidation when the material is relatively concentrated and homogenous. It may also be desirable to combine the addition of the mixture of polyethylene glycol and polyethylene oxide polymers with other additives. For instance, the flow properties of the material through a conduit may be facilitated by including an inorganic or organic coagulant. Typically where a coagulant is included it would be included in conventional amounts. We have found that surprisingly the presence of coagulants or other additives does not impair the dewatering, and consolidation of the material or indeed the rehabilitation of the area into which it is deposited.

Additionally, the mixture of polyethylene glycol and polyethylene oxide polymers of the present invention may be used in conjunction with other types of flocculants (e.g. polyacrylates, polyacrylamides, partially-hydrolyzed polyacrylamides, etc.). The combinations of treatment chemicals can involve sequential additions or simultaneous addition to the slurry in need of treatment.

Typically the suspension of particulate mineral material may be transferred along a conduit and through an outlet to the deposition area. The suspension of particulate mineral material will then be allowed to dewater at the deposition area. Preferably the suspension of particulate material that has been transferred to the deposition area will also consolidate upon standing. In many cases the deposition area will already contain consolidated mineral material. Suitably the suspension of particulate mineral material upon reaching the deposition area will flow on the surface of previously consolidated mineral material and the material will be allowed to stand and consolidate to form a stack.

Preferably the material will be pumped as a fluid to an outlet at the deposition area and the material allowed to flow over the surface of consolidated material. The material is allowed to stand and consolidate and therefore forming a stack of consolidated material. This process may be repeated several times to form a stack that comprises several layers of consolidated material. The formation of stacks of consolidated material has the advantage that less area is required for disposal.

In a mineral processing operation where a suspension containing solids is flocculated in a thickener in order to separate the suspension into a supernatant layer and an underflow material, the material can typically be treated at any suitable point before treatment in a thickener and/or after flocculation in the thickener but before the material is allowed to stand. Typically the suspension is transferred along a conduit to a deposition area. This is normally achieved by pumping the suspension of particulate mineral material. A suitable and effective dewatering amount of the polymers can be mixed with the material prior to or during a pumping stage. In this way the polymers can be distributed throughout the material.

Alternatively, the mixture of polyethylene glycol and polyethylene oxide polymers can be introduced and mixed with the material subsequently to a pumping stage. The most effective point of addition will depend upon the substrate and the distance from the thickener to the deposition area. If the conduit is relatively short it may be advantageous to dose the polymer mixture solution close to where the material flows from the thickener. On the other hand, where the deposition area is significantly remote from the thickener it may be desirable to introduce the polymer mixture solution closer to the outlet. In some instances it may be convenient to introduce the polymer mixture of the present invention into the material as it exits the outlet. Frequently it may be desirable to add the mixture of polyethylene glycol and polyethylene oxide polymers to the suspension before it exits the outlet, preferably within 10 meters of the outlet. For slurries taken from a tailings pond, treatment can be made via in-line addition of flocculant to the flowing slurry. The treated material can then be sent to a pit, sloped surface or further treated in a filter press, belt press or centrifuge before placement in a disposal area.

The rheological characteristics of the material as it flows through the conduit to the deposition area is important, since any significant reduction in flow characteristics could seriously impair the efficiency of the process. It is important that there is no significant settling of the solids as this could result in a blockage, which may mean that the plant has to be closed to allow the blockage to be cleared. In addition it is important that there is no significant reduction in flow characteristics, since this could drastically impair the pumpability of the material. Such a deleterious effect could result in significantly increased energy costs as pumping becomes harder and the likelihood of increased wear on the pumping equipment.

The rheological characteristics of the suspension of particulate mineral material as it dewaters is important, since once the material is allowed to stand it is important that flow is minimized and that ideally solidification and preferably consolidation of the material proceeds at a steady if not rapid pace. If the material is too fluid then it will not form an effective stack and there is also a risk that it will contaminate water released from the material. It is also desirable that the consolidated material is sufficiently strong to remain intact and withstand the weight of subsequent layers of consolidated material being applied to it.

Preferably the process of the invention will achieve a heaped disposal geometry and will co-immobilize the treated fine and course fractions of the solids in the material. The heaped geometry appears to give a higher downward compaction pressure on underlying solids which seems to be responsible for enhancing the rate of dewatering. We find that this geometry results in a greater amount of waste per surface area, which is both environmentally and economically beneficial.

A preferred feature of the present invention is the consolidation during the release of aqueous liquor that preferably occurs during the dewatering step. Thus in a preferred form of the invention the material is dewatered during consolidation to release liquor containing significantly less solids. The liquor can then be returned to the process thus reducing the volume of imported water required and therefore it is important that the liquor is clear and substantially free of contaminants, especially migrating particulate fines. Suitably, the liquor may for instance be recycled to the thickener from which the material is separated as an underflow.

High molecular weight polyethylene oxide polymers and methods to make said polymers are known, for example see WO 2013116027. In one embodiment of the present invention, a zinc catalyst, such as disclosed in U.S. Pat. No. 4,667,013, can be employed to make the polyethylene oxide polymers of the present invention. In a preferred embodiment the catalyst used to make the polyethylene oxide polymers of the present invention is a calcium catalyst such as those disclosed in U.S. Pat. Nos. 2,969,402; 3,037,943; 3,627,702; 4,193,892; and 4,267,309, all of which are incorporated by reference herein in their entirety. Polyethylene glycol (PEG) and polyethylene oxide (PEO) refer to an oligomer or polymer of ethylene oxide represented by the formula H—(O—CH$_2$—CH$_2$)$_n$—OH, where n refers to the number of repeat units in the polymer. Polymers with molecular mass less than 35,000 g/mol are referred to as PEG's while PEO refers to polyethylene oxide polymers of much higher molecular mass (i.e., greater than 35,000 g/mol). The polymer is characterized by the average molecular mass and suitable polymers can be linear or branched. Typically, n for PEG is small and is in the range from 2 to 800. In general, the average molecular mass of the low molecular mass polyethylene glycol (PEG) useful in the present invention is from 106 g/mol to 35,000 g/mol. Preferably the average molecular mass of the low molecular mass PEG is equal to or greater than 100 g/mol, in other embodiments it is equal to or greater than 190 g/mol, in other embodiments it is equal to or greater than 200 g/mol, in other embodiments it is equal to or greater than 285 g/mol, and in additional embodiments it is equal to or greater than 300 g/mol. In general, the average molecular mass of the low molecular mass PEG is equal to or less than 35,000 g/mol, in other embodiments it is equal to or less than 30,000 g/mol, in other embodiments it is equal to or less than 25,000 g/mol, in other embodiments it is equal to or less than 20,000 g/mol, in other embodiments it is equal to or less than 15,000 g/mol, in other embodiments it is equal to or less than 10,000 g/mol, in other embodiments it is equal to or less than 9,000 g/mol, in other embodiments it is equal to or less than 8,000 g/mol, in other embodiments it is equal to or less than 5,000 g/mol, and in additional embodiments it is equal to or less than 1,000 g/mol.

PEG compositions can be liquids or low melting solids, depending on the molecular mass of the polymer. PEG 400 generally refers to a PEG formulation with an average molecular mass between 380 g/mole and 420 g/mole. PEG 400 is commercially available, for example, as Dow CARBOWAX™ PEG 400. PEG 600 generally refers to a PEG formulation with an average molecular mass between 570 g/mole and 630 g/mole. Above a molecular mass of roughly 800 g/mole, PEG can be a waxy paste like material at room temperature. Other suitable commercial low molecular mass PEG are available from The Dow Chemical, for example, CARBOWAX PEG 200, 300, 540, 1000, 1450, 3350, 4000, 4600, 6000, and 8000. Other suitable commercial low molecular mass PEG are available from BASF are PLURIOL™ E300, E400, E600, E4000, E6000, and E8000.

Typically, n for high molecular mass variations of this polyethylene oxide (PEO) is large and is in the range of from 2,000 to 350,000. For example, when n is equal to 10,000 the high molecular mass PEO has a molecular mass of 440,530 g/mol. In general, the average molecular mass of the high molecular mass polyethylene oxide (PEO) is from 100,000 g/mol to 15,000,000 g/mol. Preferably the average molecular mass of high molecular mass PEO is equal to or greater than 1,000,000 g/mol, in other embodiments it is equal to or greater than 5,000,000 g/mol, and in additional embodiments it is equal to or greater than 8,000,000 g/mol. In general, the average molecular mass of the high molecular mass PEO is equal to or less than 12,000,000 g/mol, in other embodiments it is equal to or less than 10,000,000 g/mol, and in additional embodiments it is equal to or less than 9,000,000 g/mol.

A person of ordinary skill in the art will recognize that additional ranges of the high molecular mass PEO within the explicit ranges above are contemplated and are within the present disclosure. Suitable commercial high molecular mass PEO are available from The Dow Chemical, for example, POLYOX™ WSR N-10, N-80, N-750, N-3000, 205, 1105, N-12K, N-60K, 301, Coagulant, 303, and 308 or UCARFLOC™ 300, 302, 304, 309, and 310.

The mixture of polyethylene glycol and polyethylene oxide polymers of the present invention comprise (i) at least one PEG with an molecular mass equal to or less than 35,000 g/mol, preferably equal to or less than 20,000 g/mol, more preferably equal to or less than 8,000 g/mol and (ii) at least one PEO having a molecular mass equal to or greater than 1,000,000 g/mol, preferably equal to or greater than 8,000,000 g/mol.

The amount of the PEG component (i) in the polyethylene oxide mixture of the present invention is present in an amount from 1 weight percent to 99 weight percent and the amount of the PEO component (ii) in the polyethylene oxide mixture of the present invention is present in the amount from 99 weight percent to 1 weight percent.

The amount of the PEG component (i) in the polyethylene oxide mixture of the present invention is present in an amount equal to or greater than 1 weight percent and equal to or less than 99 weight percent, preferably equal to or less than 95 weight percent, preferably equal to or less than 90 weight percent, more preferably equal to or less than 80 weight percent, more preferably equal to or less than 70 weight percent, more preferably equal to or less than 60 weight percent, more preferably equal to or less than 50 weight percent, more preferably equal to or less than 40 weight percent, more preferably equal to or less than 30 weight percent, more preferably equal to or less than 20 weight percent, more preferably equal to or less than 10 weight percent, and more preferably equal to or less than 5 weight percent based on the combined weight of the mixture of the PEG and PEO.

The amount of the PEO component (ii) in the polyethylene oxide mixture of the present invention is present in an amount equal to or less than 99 weight percent and present in an amount equal to or greater than 1 weight percent, preferably equal to or greater than 5 weight percent, preferably equal to or greater than 10 weight percent, more preferably equal to or greater than 20 weight percent, more preferably equal to or greater than 30 weight percent, more preferably equal to or greater than 40 weight percent, more preferably equal to or greater than 50 weight percent, more preferably equal to or greater than 60 weight percent, more preferably equal to or greater than 70 weight percent, more preferably equal to or greater than 80 weight percent, more preferably equal to or greater than 90 weight percent, and most preferably equal to or greater than 95 weight percent based on the combined weight of the mixture of the PEG and PEO.

The mixture of polyethylene glycol and polyethylene oxide polymers of the present invention is added directly to the above mentioned suspension of particulate material. The mixture of polyethylene glycol and polyethylene oxide polymers may be in a substantially dry form or preferably added as an aqueous solution. If added as an aqueous solution, the solution preferably contains from 0.3 to 0.5 weight percent of the combined weight of the polyethylene glycol and polyethylene oxide polymers.

The mixture of polyethylene glycol and polyethylene oxide polymers is particularly suitable as flocculation agents for suspensions of particulate material, especially waste mineral slurries. The mixture of polyethylene glycol and polyethylene oxide polymers of the present invention is particularly suitable for the treatment of tailings and other waste material resulting from mineral processing, in particular, processing of oil sands tailings.

EXAMPLES

The following polyethylene oxides are used in Examples 1 to 9 and Comparative Examples A to D:

"PEG-1" is a low molecular mass polyethylene glycol with an average n of 6.4 having an average molecular mass of 285 to 315 g/mol, a viscosity of 6 cP at 100° C., is liquid at room temperature, and it is available as CARBOWAX™ PEG 300 from The Dow Chemical Company;

"PEG-2" is a low molecular mass polyethylene glycol with an average n of 104.1 having an average molecular mass of 4,140 to 5,060 g/mol, a viscosity of 184 cP at 100° C., is solid at room temperature, and it is available as CARBOWAX PEG 4600 from The Dow Chemical Company;

"PEG-3" is a low molecular mass polyethylene glycol with an average n of 181.4 having an average molecular mass of 7,000 to 8,000 g/mol, a viscosity of 822 cP at 100° C., is solid at room temperature, and it is available as CARBOWAX PEG 8000 from The Dow Chemical Company; and "PEO" is a high molecular mass polyethylene oxide polymer having a molecular mass of 8,000,000 g/mol and is available as POLYOX™ WSR 308 from The Dow Chemical Company.

The software application Library Studio (FreeSlate Inc., Sunnyvale, Calif.) is used to design the high-throughput sample preparation and settling tests, and convert the design into a template suitable for use by a robotic liquid handler. Experiments are typically done in small scale (~5 mL) with samples arranged in a 4×6 plate array. In this design, up to twelve samples are prepared with varying amounts of flocculant in each to enable a dose-response curve to be generated. An appropriate amount of tailings and process water are added to maintain a constant solids loading.

Stock solutions of flocculants are prepared at 0.4 wt % (4000 ppm) by dissolving the mixture of polyethylene glycol and polyethylene oxide polymers in operator recycle water, and stirring magnetically at 300 rpm for five minutes then at 130 rpm for a total of one hour. Flocculant solutions are equilibrated for at least 2 hours at room temperature before use. Mature fine tailings (MFT) having 42 wt % solids are obtained from an oil sands operator in Alberta and diluted to 34 wt % solids. Water used for this dilution process is obtained from the same ponds from which the tailings are sampled. The tailings are shaken for 30 minutes in a horizontal shaker before dispensing into the 10 mL vials. Compositions of Examples 1 to 9 and Comparative Examples A to D are shown in Table 1.

TABLE 1

| | PEG-1, ppm | PEG-2, ppm | PEG-3, ppm | PEO, ppm |
|---|---|---|---|---|
| Com. Ex. A | | | | 4,000 |
| Com. Ex. B | 4,000 | | | |
| Ex. 1 | 1,000 | | | 3,000 |
| Ex. 2 | 2,000 | | | 2,000 |
| Ex. 3 | 3,000 | | | 1,000 |
| Com. Ex. C | | 4,000 | | |
| Ex. 4 | | 1,000 | | 3,000 |
| Ex. 5 | | 2,000 | | 2,000 |
| Ex. 6 | | 3,000 | | 1,000 |
| Com. Ex. D | | | 4,000 | |
| Ex. 7 | | | 1,000 | 3,000 |
| Ex. 8 | | | 2,000 | 2,000 |
| Ex. 9 | | | 3,000 | 1,000 |

A small amount of tailings (~4 g) is dispensed by pipet into 10-mL glass vials. All remaining sample additions and formulation mixing are accomplished using a liquid handling robot (FreeSlate Inc., Sunnyvale, Calif.). Any additional recycle water required to dilute the tailings is added to the vials by a robotically-controlled 250-μL disposable positive displacement (PD) pipette. The vials are stirred on deck at 100 rpm for 5 minutes using a magnetic mini-stir disk (V&P Scientific, CA) to ensure homogeneity immediately before the addition of the flocculant solution. The desired amount of flocculant solution is then accurately delivered to each vial robotically with a 250-μL or 1000-μL PD pipette while stirring at 100 rpm, and stirring is allowed to continue for 3 minutes. The total amount of tailings and flocculant is approximately 4 g in each vial. Both the speed of dispense as well as the point of delivery in the vial is controlled by the robot. The flocculant solution is reproducibly added at a range of 1 to 4 mm from the top of the tailings. After completing the dispense and stir steps, the solution is capped and moved onto the imaging portion of the workflow.

To determine the settling rate, the individual vials are removed periodically from the plate by one of the robotic arms and placed in the imaging chamber on the robot deck, where a digital image of the sample is collected. Significant improvements to the image chamber lighting and lens systems are made to obtain high quality images of the settling tailings and exuded water, since the tailings themselves are an opaque brown material and challenging to image in detail. Improvements to the robotic protocol allowed images to be collected as quickly as 10-15 seconds after the cessation of mixing, and as rapidly as 5 seconds between images as needed. In this way, very rapid settling could be observed. Settling tests are completed over a 20-24 hour time period. The digital images are automatically stored in the database and are indexed to the library identification number associated with the sample generation information. The digital images are processed with a MATLAB-based algorithm that automatically extracts the mud height for further data analysis.

Figure 1:
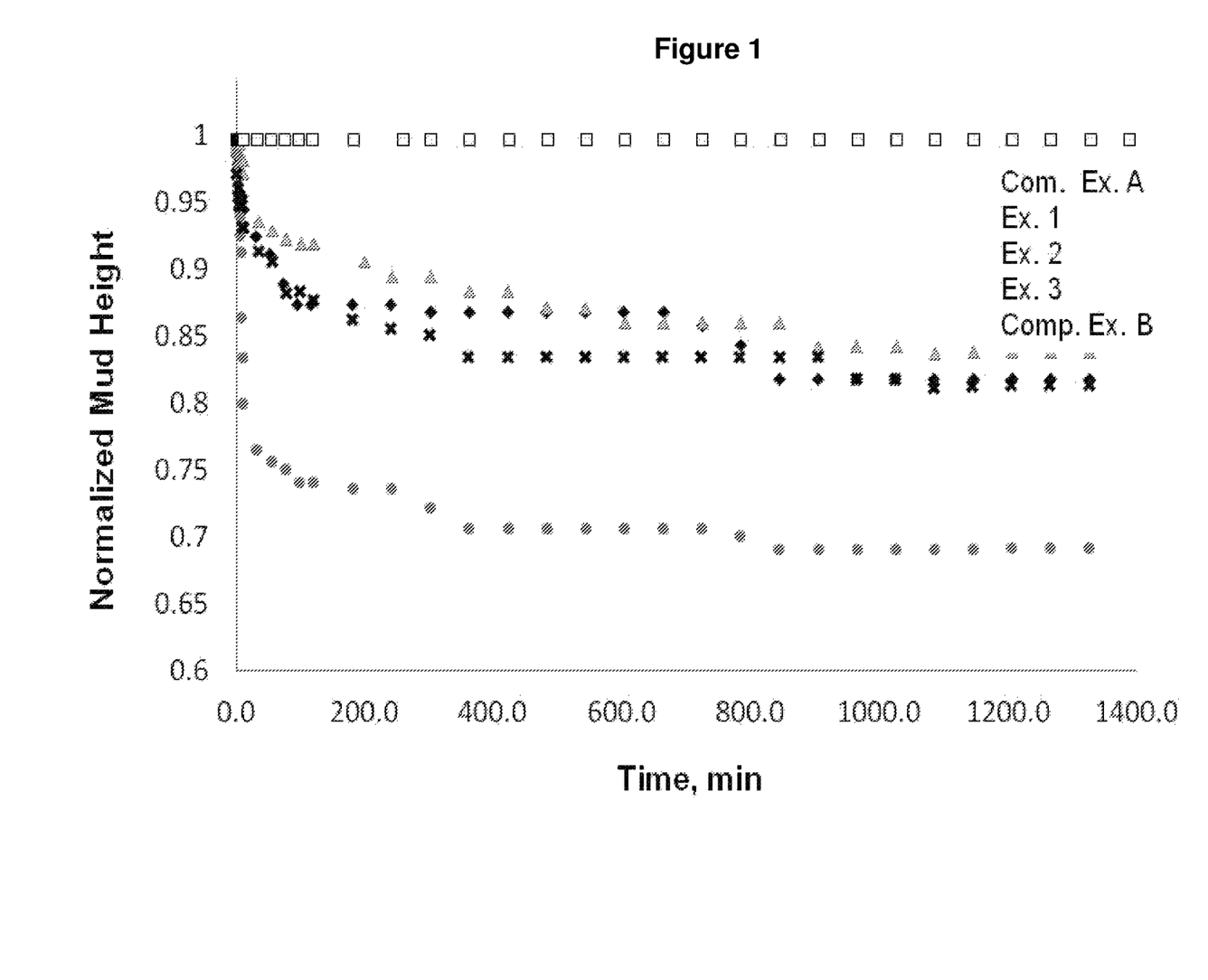
FIG. 1 shows the settling results for Examples 1, 2, and 3 and Comparative Examples A and B.
Figure 2:
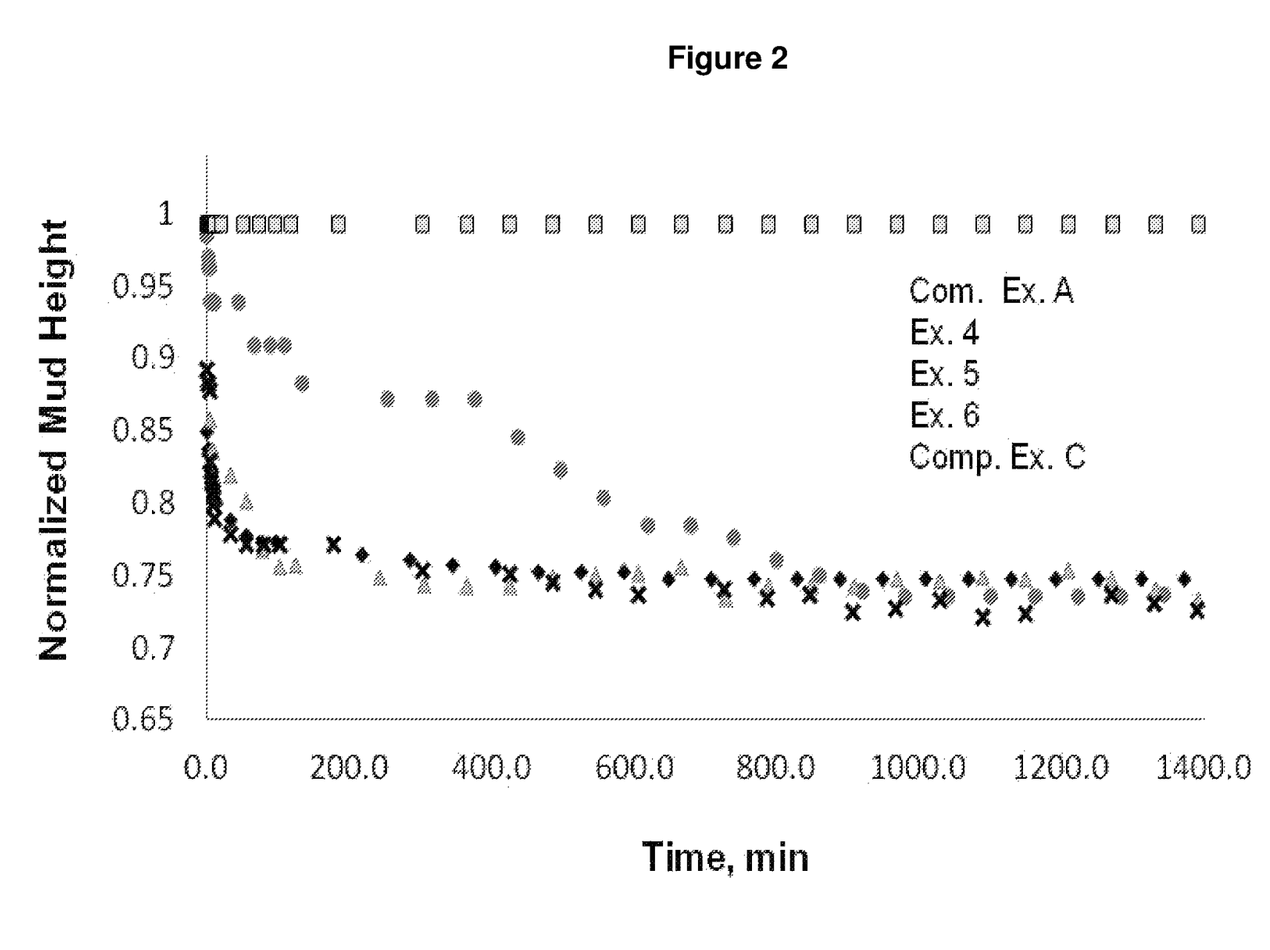
FIG. 2 shows the settling results for Examples 4, 5, and 6 and Comparative Examples A and C.
Figure 3:
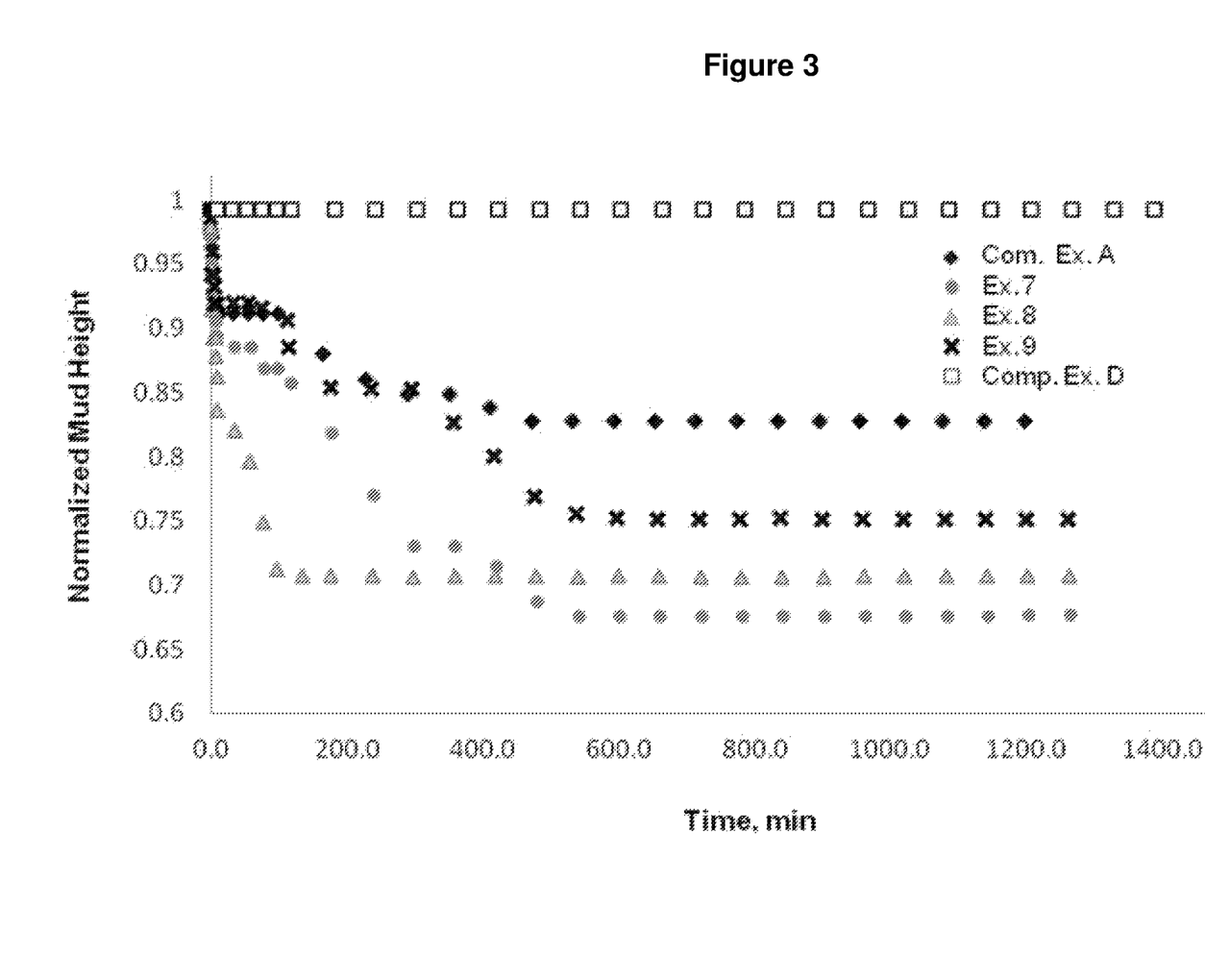
FIG. 3 shows the settling results for Example 7, 8, and 9 and Comparative Examples A and D.

The settling results for Examples 1, 2, and 3 and Comparative Examples A and B are shown in FIG. 1. The settling results for Examples 4, 5, and 6 and Comparative Examples A and C are shown in FIG. 2. The settling results for Example 7, 8, and 9 and Comparative Examples A and D are shown in FIG. 3. As can be seen, substituting high molecular weight PEO with a low molecular weight PEG results in improved dewatering performance. The ability of low molecular weight PEGs to act synergistically with PEO is unprecedented in the dewatering of oil sand tailings.

What is claimed is:

1. A method of dewatering oil sands tailings, the method comprising the steps of:
  a) adding to oil sands tailings a mixture of polyethylene glycol and polyethylene oxide polymers comprising
    (i) one or more low molecular mass polyethylene glycol polymer (PEG) having a molecular mass equal to or less than 35,000 g/mol; and
    (ii) one or more high molecular mass polyethylene oxide polymer (PEO) having a molecular mass greater than 1,000,000 g/mol;
  b) allowing the oil sands tailings and mixture of polyethylene glycol and polyethylene oxide polymers_to flocculate; and
  c) allowing dewatering of the oil sands tailings from step (b) to occur.

2. The method of claim 1 wherein
(i) the low molecular mass PEG has a molecular mass of 100 g/mol to 20,000 g/mol and
(ii) the high molecular mass PEO has a molecular mass of 8,000,000 g/mol to 10,000,000 g/mol.

3. The method of claim 1 wherein
(i) the low molecular mass PEG has a molecular mass of 190 g/mol to 9,000 g/mol and
(ii) the high molecular mass PEO has a molecular mass of 8,000,000 g/mol to 10,000,000 g/mol.

4. The method of claim 1 wherein the mixture of polyethylene glycol and polyethylene oxide polymers is added as an aqueous mixture.

5. The method of claim 1 wherein
(i) the low molecular mass PEG has a molecular mass of 4,100 g/mol to 20,000 g/mol and
(ii) the high molecular mass PEO has a molecular mass of 5,000,000 g/mol to 12,000,000 g/mol.

6. The method claim 1 wherein the allowing of dewatering of the oil sands tailings from step (b) to occur at a deposition area.

7. The method of claim 6 wherein:
(i) the low molecular mass PEG has a molecular mass of 100 g/mol to 20,000 g/mol and is present in an amount equal to or greater than 20 weight percent in the mixture based on a combined weight of the low molecular mass PEG and the high molecular mass PEO, and
(ii) the high molecular mass PEO has a molecular mass of 5,000,000 g/mol to 12,000,000 g/mol and is present in an amount equal to or greater than 20 weight percent in the mixture based on a combined weight of the low molecular mass PEG and the high molecular mass PEO.

8. The method of claim 6 wherein:
(i) the low molecular mass PEG has a molecular mass of 4,100 g/mol to 20,000 g/mol and is present in an amount equal to or greater than 20 weight percent in the mixture based on a combined weight of the low molecular mass PEG and the high molecular mass PEO, and
(ii) the high molecular mass PEO has a molecular mass of 5,000,000 g/mol to 10,000,000 g/mol and is present in an amount equal to or greater than 20 weight percent in the mixture based on a combined weight of the low molecular mass PEG and the high molecular mass PEO.

9. The method of claim 6 wherein:
(i) the low molecular mass PEG has a molecular mass of 800 g/mol to 20,000 g/mol and is present in an amount equal to or greater than 20 weight percent in the mixture based on a combined weight of the low molecular mass PEG and the high molecular mass PEO, and
(ii) the high molecular mass PEO has a molecular mass of 5,000,000 g/mol to 12,000,000 g/mol and is present in an amount equal to or greater than 20 weight percent in the mixture based on a combined weight of the low molecular mass PEG and the high molecular mass PEO.

10. The method of claim 1 wherein the low molecular mass PEG has a molecular mass of 4,100 g/mol to 20,000 g/mol.

11. The method of claim 1 wherein:
(i) the low molecular mass PEG has a molecular mass of 100 g/mol to 20,000 g/mol, and
(ii) the high molecular mass PEO has a molecular mass of 5,000,000 g/mol to 12,000,000 g/mol.

12. The method of claim 1 wherein
(i) the low molecular mass PEG has a molecular mass of 800 g/mol to 20,000 g/mol and
(ii) the high molecular mass PEO has a molecular mass of 8,000,000 g/mol to 10,000,000 g/mol.

13. The method of claim 1 wherein
(i) the low molecular mass PEG has a molecular mass of 800 g/mol to 9,000 g/mol and
(ii) the high molecular mass PEO has a molecular mass of 8,000,000 g/mol to 10,000,000 g/mol.

14. The method of claim 1 wherein:
(i) the low molecular mass PEG has a molecular mass of 800 g/mol to 20,000 g/mol, and
(ii) the high molecular mass PEO has a molecular mass of 5,000,000 g/mol to 12,000,000 g/mol.

* * * * *